US006664124B1

(12) United States Patent
Stenton et al.

(10) Patent No.: US 6,664,124 B1
(45) Date of Patent: Dec. 16, 2003

(54) FABRICATION OF THIN-FILM OPTICAL DEVICES

(75) Inventors: Conrad Stenton, Midland (CA); Lothar Scheld, Penetanguishene (CA); Margarete Neumann, Penetanguishene (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/122,709

(22) Filed: Apr. 12, 2002

(51) Int. Cl.[7] .............................................. H01L 21/00
(52) U.S. Cl. ......................................... 438/22; 438/128
(58) Field of Search .............................. 438/22, 31, 32, 438/34, 35, 39, 40, 75, 128, 142

(56) References Cited

U.S. PATENT DOCUMENTS

| | | | |
|---|---|---|---|
| 4,244,045 A | 1/1981 | Nosu et al. | |
| 4,904,043 A | 2/1990 | Schweizer | |
| 5,401,983 A * | 3/1995 | Jokerst et al. | ................. 257/82 |
| 5,583,683 A | 12/1996 | Scobey | |
| 5,889,904 A | 3/1999 | Pan et al. | |
| 5,946,435 A | 8/1999 | Zheng et al. | |
| 6,215,592 B1 * | 4/2001 | Pelekhaty | .................... 359/618 |
| 6,498,682 B2 * | 12/2002 | Glance | ........................ 359/578 |

* cited by examiner

Primary Examiner—David Nhu
(74) Attorney, Agent, or Firm—William C. Schubert; Glenn H. Lenzen, Jr.

(57) ABSTRACT

A number of optical devices are fabricated by forming a pattern of channels on a first side of a substrate to define a plurality of mesas on the first side of the substrate. A thin-film optical structure is deposited onto each of the mesas. An excess thickness of the substrate is removed from each thin-film optical device, preferably by temporarily affixing a temporary support to the tops of each thin-film optical structure, removing an excess amount of the substrate from a second side of the substrate so that the thin-film optical devices are isolated from each other but affixed to the temporary support, and separating the tops of the thin-film optical structures from the temporary support.

16 Claims, 2 Drawing Sheets

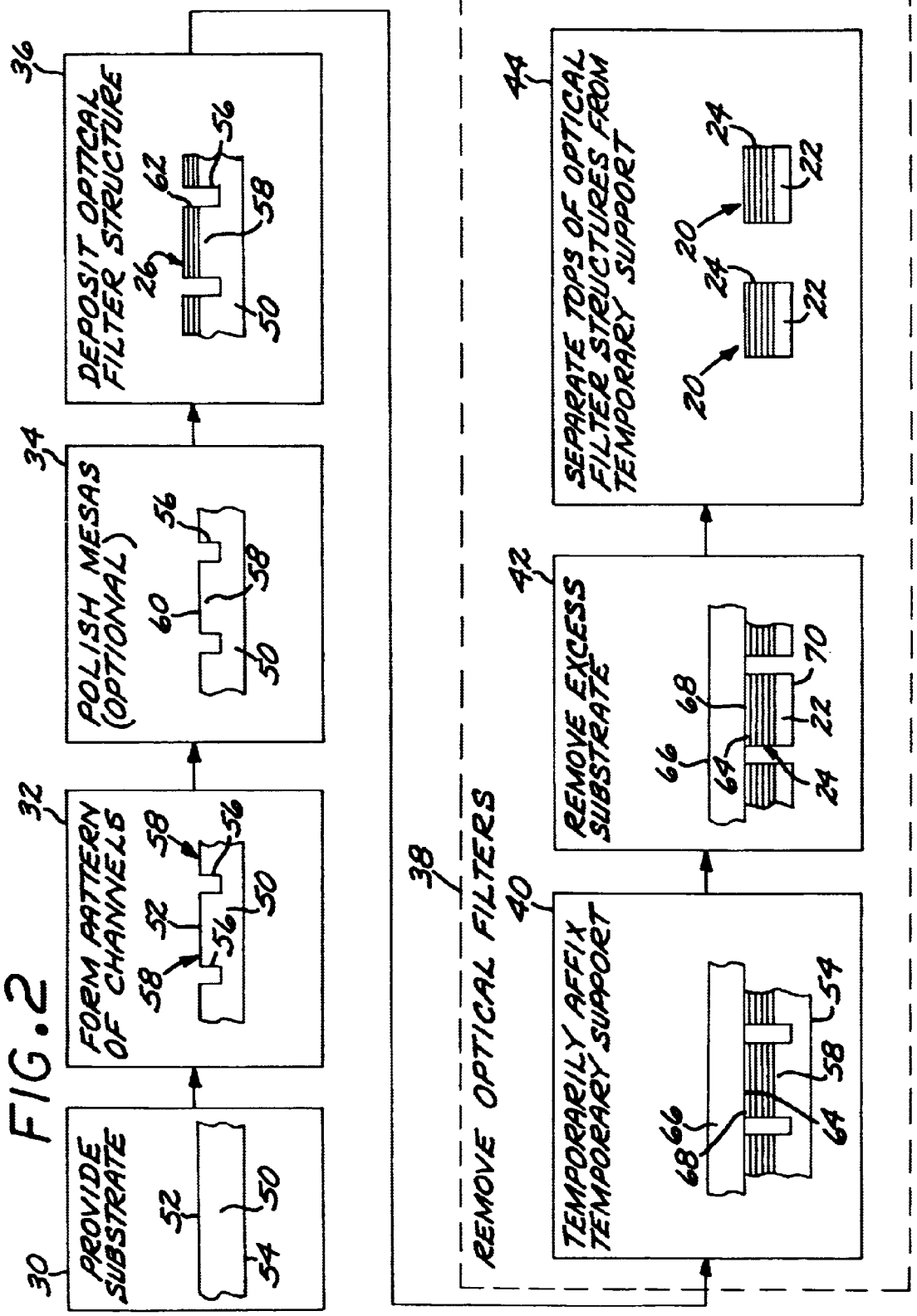

FABRICATION OF THIN-FILM OPTICAL DEVICES

BACKGROUND OF THE INVENTION

1. Field of the Invention

This invention relates to the fabrication of thin-film optical devices and, more particularly, to the fabrication of large numbers of such optical devices in a low-stress configuration.

2. Description of the Related Art

Thin-film optical devices, such as thin-film optical filters, are used to separate light of different wavelengths. The thin-film optical filters are formed as a series of thin layers of material deposited one over the other, with as many as several hundred layers in total. Light of some wavelengths is transmitted through the thin-film optical filter, while light of other wavelengths is reflected from the thin-film optical filter. The specific transmitted and reflected wavelengths are determined by the selection of the materials of construction and the thicknesses of the layers. The thin-film optical filters are included in optical systems to perform any of a variety of functions that require separation of a light beam into its component wavelengths. An example of such an optical system is a wavelength division demultiplexer.

To fabricate large numbers of thin-film optical filters by conventional mass-production procedures, a transparent substrate of the desired final thickness is provided. The multiple layers that form the thin-film-optical filter are deposited onto the substrate. The substrate and the overlying thin film structure are thereafter diced into smaller pieces that constitute the individual thin-film optical filters.

As part of the work leading to the present invention, the inventors have recognized that the thin-film optical devices produced by this approach have several shortcomings. Foremost among these shortcomings is the residual stresses that result from the elevated-temperature deposition of layers of differing coefficients of thermal expansion onto a substrate with yet a different coefficient of thermal expansion. Upon cooling and dicing, the thin-film optical filters bend responsive to the residual differential thermal strains, warping the thin-film optical structure so that a restraining structure is needed to hold the thin-film optical structures in a flat configuration. Additionally, the edge of each layer of the thin-film optical structure is subject to corrosion and other degradation during use.

There is therefore a need for an approach to the fabrication of thin-film optical devices that overcomes these problems. The present invention fulfills this need, and further provides related advantages.

SUMMARY OF THE INVENTION

The present invention provides a method for fabricating thin-film optical devices that greatly reduces the internal stresses within the optical device, and therefore the tendency for the optical device to warp, as compared with conventional approaches. The edges of the thin films are sealed in the fabrication process, reducing their susceptibility to corrosion. The present approach does not require any change in the nature or thicknesses of the thin films that make up the optical device, so that there is no change to the functionality of the thin-film optical device. The present approach is applicable to a wide range of thin-film optical devices, such as thin-film optical filters.

In accordance with the invention, a method for fabricating thin-film optical devices, such as thin-film optical filters comprises the steps of providing a substrate having a first side and a second side, thereafter forming a pattern of channels on the first side of the substrate to define a plurality of mesas on the first side of the substrate, thereafter depositing a thin-film optical structure onto each of the mesas, and thereafter removing an excess portion of the substrate. The thin-film optical structure is transparent to a selected wavelength of light, and the substrate is preferably transparent to that same selected wavelength of light.

The step of removing is preferably performed by temporarily affixing a temporary support to the top of each thin-film optical structure, removing an excess thickness of the substrate from the second side of the substrate so that the thin-film optical structures are isolated from each other but affixed to the temporary support, and separating the tops of the thin-film optical structures from the temporary support. The step of temporarily affixing may include utilizing a non-permanent adhesive to affix the temporary support to the tops of the thin-film optical structures, and the step of separating includes the step of debonding the non-permanent adhesive by an appropriate technique such as a solvent or heating.

The pattern of channels may be produced by any operable technique, with sawing being preferred. The thin-film optical structure may be of any operable type. The deposition preferably is performed by mounting the substrate on a rotating deposition stage such as a planetary deposition stage, and depositing the thin-film optical structure from a deposition source while rotating the substrate on the rotating deposition stage. This rotational deposition results in the deposition of the material of each layer onto the layer, but onto the sides of the optical device as well, thereby sealing the edges of the previously deposited layers.

The present approach cuts the pattern of channels to define the mesas prior to the deposition of the thin-film layers. As a result, the residual stresses that are created during the deposition process are limited by the relatively short lengths of each mesa that lie in the plane of the deposited layers. By contrast, in the conventional process that dices the substrate and deposited layers after deposition of the thin-film structure, the residual stresses increase proportional to the total lateral dimension of the substrate and therefore are much larger than experienced with the present approach. The result is that there is far less tendency in the present approach for the individual thin-film optical devices to warp responsive to the residual stresses, as compared with the prior approach. The present approach also seals the edges of the deposited layers with the material of each successively deposited layer, so that the edges of the deposited layers are not exposed to corrosion during their later service.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a block diagram of a method for fabricating the thin-film optical device, showing the structure schematically at each stage of the fabrication.

DETAILED DESCRIPTION OF THE INVENTION

Figure 1:
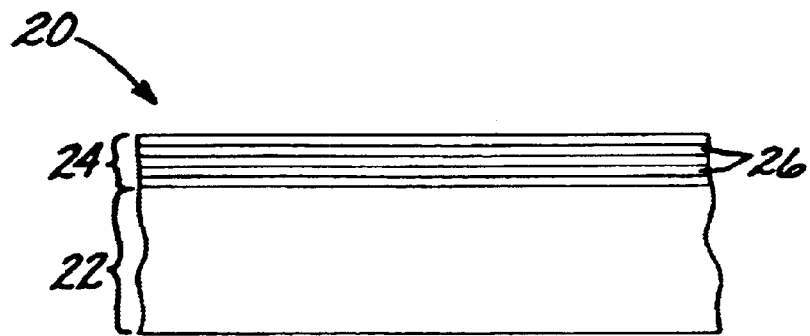
FIG. 1 is a perspective view of a thin-film optical device.

The preferred application of the present invention is the fabrication of thin-film optical filters, one type of thin-film optical device. The following discussion will therefore focus on the fabrication of thin-film optical filters, with the understanding that the technique is more broadly applicable to other thin-film optical devices as well. FIG. 1 depicts a multilayer thin-film optical filter 20 having a substrate 22 and a thin-film optical structure 24 deposited upon the substrate 22. The thin-film optical structure 24 includes at least two, and typically a plurality of up to and including several hundred, individual layers 26. The thin-film optical structure 24 and the substrate 22 are transparent to a selected wavelength of light (which includes either discrete wavelengths or ranges of wavelengths). For example, the thin-film optical structure 24 and the substrate 22 may be transparent to a specific visible wavelength or range of visible wavelengths. Thin-film optical filters 20, such as Fabry-Perot optical filters, and their layered materials of construction and thicknesses are known in the art. See, for example, U.S. Pat. No. 4,244,045, 5,583,683, and 6,215,592, whose disclosures are incorporated by reference. The drawings herein are not to scale, and the thin-film optical structure 24 is normally much thinner than the substrate 22. The present invention is not concerned with the types and arrangements of the layers of such thin-film optical filters 20, which are known in the art, but instead with the fabrication of large numbers of such thin-film optical filters on a production scale.

FIG. 2 depicts an approach for fabricating large numbers of the thin-film optical filters 20. A substrate 50 is provided, numeral 30. The substrate 50 is thicker than the substrate 22 of the final thin-film optical filter 20, and is typically about 2 millimeters thick. The substrate 50 is made of a material that is transparent to the selected wavelength of light. In the case of visible light, for example, the substrate 50 may be made of high-quality silica glass. The substrate 50 may be described as having a first side 52 and a second side 54.

A pattern of channels 56 is thereafter formed on the first side 52 of the substrate 50, numeral 32. These channels 56 may be formed by any operable approach, with sawing being preferred. The channels 56 do not constitute a part of the optical path, and therefore it is not necessary that their sides or bottom be of optical quality. The pattern of the channels 56 may be of any desired shape, but is typically a rectilinear or square pattern. The spaces between the channels 56 on the first side 52 of the substrate 50 defines a plurality of mesas 58 on the first side 52 of the substrate 50.

The tops 60 of the mesas 58 are thereafter optionally polished, numeral 34. The tops 60 of the mesas 58 are at the original first side 52 of the substrate 50. The tops 60 are in the light path of the final thin-film optical filters 20, and therefore must be of optical quality. The polishing step 34 provides that optical quality in the event that the first side 52 of the substrate 50 was not furnished in the polished state. The polishing 34 is performed by conventional optical polishing techniques.

Figure 3:
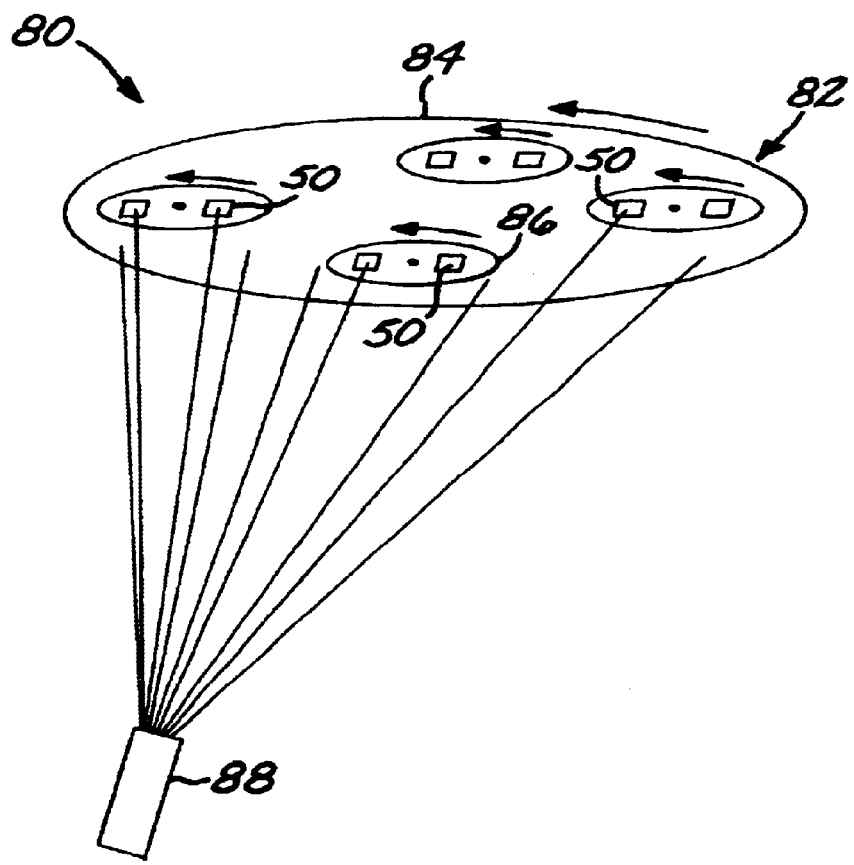
FIG. 3 is a schematic representation of a deposition apparatus employing a rotating deposition stage.

The thin-film optical structure 24 is thereafter deposited onto the tops 60 of each of the mesas 58, numeral 60. FIG. 3 illustrates a preferred deposition apparatus 80. The apparatus 80 includes a rotating deposition stage 82, in this case a planetary deposition stage having a first rotating stage 84 and a second rotating stage 86 that is supported on the first rotating stage 84. The substrate 50 from step 32 (or optional step 34) is positioned on the rotating deposition stage 82, and in the illustrated case on the second rotating stage 86. The substrate 50 is rotated past a deposition source 88 that is programmed to sequentially deposit the desired types and thicknesses of the individual layers 26 onto the tops 60 of the mesas 58. For example, the deposition source 88 may deposit the required layers 26 as described in the '045, '683, or '592 patents, or other types and thicknesses of layers. The layers 26 may define a Fabry-Perot optical filter or other type of optical device. The deposition is a general one over the entire exposed area, so that the layers 26 are deposited both onto the tops 60 of the mesas 58, the sides of the mesas 58 and the sides 62 of the previously deposited layers 26, and the bottoms of the channels 56. The material deposited onto the sides of the mesas 58 and the sides 62 of the previously deposited layers 26 seals the sides of the mesas 58 and the sides 62 of the previously deposited layers 26, leading to improved corrosion and oxidation resistance during subsequent service. The material deposited onto the bottoms of the channels 56 is removed in a subsequent step, and its quality is unimportant.

At this stage of the fabrication processing, the optical structure 24 is in place, but the optical filters are joined together in a monolithic form. Continuing the fabrication, an excess portion of the substrate 50 is thereafter removed from each thin-film optical filter 20 to separate the individual optical filters, numeral 38. In one possible technique, the channels 56 would be deepened further to complete the separation of the individual thin-film optical filters 20.

Instead, it is preferred to use the approach depicted in FIG. 2. The tops 64 of the thin-film optical structures 24 are temporarily affixed to a temporary support 66, numeral 40. The affixing is preferably performed by using a layer 68 of a non-permanent adhesive to affix the temporary support 66 to the tops 64 of the thin-film optical structure 24.

An excess thickness of the substrate 50 is removed from the second side 54 of the substrate 50 so that the thin-film optical structures 24 are isolated from each other but remain affixed to the temporary support 66, numeral 42. The removal step 42 is preferably accomplished by a combination of grinding and polishing of the substrate 50 from the second side 54. During this removal process 42, the temporary support 66 protects the thin-film optical structure 24 and also provides the gripping location. It is preferred that the final substeps of the removal step 42 be performed by optical polishing techniques, so that a back side 70 of the final substrate 22 is of optical quality inasmuch as it is in the optical path. The amount of material removed from the second side 54 of the substrate 50 is selected so that the final thickness of substrate material is that required for the substrate 22 of the final thin-film optical filter 20.

The thin-film optical filters 20 are thereafter separated from the temporary support 66, numeral 44. The separation step 44 is performed by any operable technique appropriate to the debonding of the type of non-permanent adhesive that was used in the adhesive layer 68. For example, the adhesive may be dissolved in a suitable solvent. It may instead be heated to a temperature where it melts and/or vaporizes, so that the individual thin-film optical filters 20 may be picked off the surface of the temporary support 66.

The thin-film optical filters 20 as shown in FIG. 1 are complete and ready for use in an optical device. These thin-film optical filters 20 have sealed edges 62 to resist corrosion and oxidation. They have a low level of residual stress and consequent reduced warping, because the continuous length in the plane of the layers 26 is much smaller than in the conventional fabrication processes. The magnitude of the differential thermal stresses and differential thermal strains is proportional to the product of the difference in the coefficients of thermal expansion times the length in the plane of the layers. The channeling of the substrate in step 32 results in this length in the plane of the layers being significantly reduced.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a plurality of individual thin-film optical devices, comprising the steps of
   providing a substrate having a first side and a second side; thereafter
   forming a pattern of channels on the first side of the substrate to define a plurality of mesas on the first side of the substrate; thereafter
   depositing a thin-film optical structure onto each of the mesas, each thin-film optical structure having an exposed top; and thereafter
   removing an excess portion of the substrate to separate the plurality of individual thin-film optical devices from each other.

2. The method of claim 1, wherein the thin-film optical structure is transparent to a selected wavelength of light, and wherein the step of providing the substrate includes the step of
   providing a substrate that is transparent to the selected wavelength of light.

3. The method of claim 1, wherein the step of forming the pattern of channels includes the step of
   sawing the pattern of channels into the first side of the substrate.

4. The method of claim 1, wherein the step of depositing includes the step of
   mounting the substrate on a rotating deposition stage, and
   depositing the thin-film optical structure from a deposition source while rotating the substrate on the rotating deposition stage.

5. A method for fabricating thin-film optical devices, comprising the steps of
   providing a substrate having a first side and a second side; thereafter
   forming a pattern of channels on the first side of the substrate to define a plurality of mesas on the first side of the substrate; thereafter
   depositing a thin-film optical structure onto each of the mesas, each thin-film optical structure having an exposed top; and thereafter
   removing an excess portion of the substrate, wherein the step of removing includes the steps of
      temporarily affixing a temporary support to the top of each thin-film optical structure,
      removing an excess thickness of the substrate from the second side of the substrate so that the thin-film optical structures are isolated from each other but affixed to the temporary support, and
      separating the tops of the thin-film optical structures from the temporary support, thereby forming the thin-film optical devices.

6. The method of claim 5, wherein the step of temporarily affixing includes the step of
   utilizing a non-permanent adhesive to affix the temporary support to the top of each thin-film optical structure, and wherein the step of separating includes the step of
   debonding the non-permanent adhesive.

7. The method of claim 1, including an additional step, after the step of forming and before the step of depositing, of
   polishing the mesas.

8. The method of claim 1, wherein the thin-film optical devices are thin-film optical filters.

9. The method of claim 1, wherein the thin-film optical devices are Fabry-Perot thin-film optical filters.

10. A method for fabricating thin-film optical devices transparent to a selected wavelength of light, comprising the steps of
    providing a substrate that is transparent to the selected wavelength of light and has a first side and a second side; thereafter
    forming a pattern of channels on the first side of the substrate to define a plurality of mesas on the first side of the substrate; thereafter
    depositing a thin-film optical structure onto each of the mesas, each thin-film optical structure having an exposed top; thereafter
    temporarily affixing a temporary support to the tops of the thin-film optical structures; thereafter
    removing an excess thickness of the substrate from the second side of the substrate so that the thin-film optical structures are isolated from each other but affixed to the temporary support, and thereafter
    separating the tops of the thin-film optical structures from the temporary support, thereby forming the thin-film optical devices.

11. The method of claim 10, wherein the step of forming the pattern of channels includes the step of
    sawing the pattern of channels into the first side of the substrate.

12. The method of claim 10, wherein the step of depositing includes the step of
    mounting the substrate on a rotating deposition stage, and
    depositing the thin-film optical structure from a deposition source while rotating the substrate on the rotating deposition stage.

13. The method of claim 10, wherein the step of temporarily affixing includes the step of
    utilizing a non-permanent adhesive to affix the temporary support to the tops of each thin-film optical structure, and wherein the step of separating includes the step of
    debonding the non-permanent adhesive.

14. The method of claim 10, including an additional step, after the step of forming and before the step of depositing, of
    polishing the mesas.

15. The method of claim 10, wherein the thin-film optical device is a thin-film optical filter.

16. The method of claim 10, wherein the thin-film optical device is a Fabry-Perot thin-film optical filter.

* * * * *